United States Patent [19]

Kobayashi et al.

[11] Patent Number: 5,248,284
[45] Date of Patent: Sep. 28, 1993

[54] SYSTEM FOR CONTROLLING A CENTRAL DIFFERENTIAL OF A FOUR-WHEEL DRIVE MOTOR VEHICLE

[75] Inventors: Toshio Kobayashi; Hiromi Hirase, both of Tokyo, Japan

[73] Assignee: Fuji Jukogyo Kabushiki Kaisha, Tokyo, Japan

[21] Appl. No.: 963,829

[22] Filed: Oct. 20, 1992

[30] Foreign Application Priority Data

Oct. 22, 1991 [JP] Japan .................. 3-302401
Oct. 22, 1991 [JP] Japan .................. 3-302402
Oct. 22, 1991 [JP] Japan .................. 3-302403

[51] Int. Cl.$^5$ ............................. F16H 37/08
[52] U.S. Cl. ........................ 475/86; 180/248; 475/206
[58] Field of Search .......... 475/84, 86, 200, 206; 180/248

[56] References Cited

U.S. PATENT DOCUMENTS 4,787,269 11/1988 Matsumoto et al. ........... 475/86 X
4,819,506 4/1989 Matsumoto et al. .......... 180/248 X
5,066,268 11/1991 Kobayashi ................... 180/248 X

FOREIGN PATENT DOCUMENTS 4-27622 1/1992 Japan .

Primary Examiner—Dirk Wright
Attorney, Agent, or Firm—Martin A. Farber

[57] ABSTRACT

A central differential has first and second output members for distributing power of an engine through a transmission to front and rear wheels respectively, and has a third output member for controlling distribution of the power. A first friction clutch is operatively connected to the second and third output members for restricting differential operation of the central differential and for controlling distribution of the power to the front and rear wheels. A second friction clutch is operatively connected to the second output member and either of the front or rear wheels. The first friction clutch is disposed at the innermost position and the second friction clutch is disposed around the first friction clutch so as to effectively transmit and distribute power to each wheel in compact and simple structure.

8 Claims, 8 Drawing Sheets

SYSTEM FOR CONTROLLING A CENTRAL DIFFERENTIAL OF A FOUR-WHEEL DRIVE MOTOR VEHICLE

BACKGROUND OF THE INVENTION

The present invention relates to a four wheel drive motor vehicle having a central differential, and more particularly to a control system comprising a fluid operated clutch device for controlling the central differential.

A conventional four-wheel drive motor vehicle has the central differential having a control device for restricting a differential operation and for controlling distribution of a torque to front and rear wheels. Recently, the central differential is used for variably controlling the torque distribution, or used as a reduction gear or speed-up gear, thereby improving driveability, operability, stability and braking effect.

In order to provide the above mentioned multiple functions of the central differential, it is necessary to provide a plurality of friction engagement elements such as a fluid operated multiple-disk friction clutch and a brake on the differential. It is very important how to dispose these elements on the differential.

Japanese Patent Laid-open Application 4-27622 filed by the same applicant discloses a four-wheel drive motor vehicle providing a central differential which comprises a complex planetary gear device and a control device. The control device comprises first and second fluid operated multiple-disk friction clutches and the brake for a 5th speed. The first clutch is provided for transmitting the power of an engine from a transmission to front and rear wheels. The second clutch is provided for restricting the differential operation of the central differential and variably distributing torque to front and rear wheels of the vehicle. The clutches and the brake are independently constructed and disposed side by side along an axis of an output shaft of the transmission. The second clutch is connected to a carrier of the central differential through three connecting parts by welding. Furthermore, an oil chamber of the second clutch is provided in a rotating drum.

Accordingly, the transmission becomes long in the axial direction, resulting in increase of the size and weight thereof. Hence the legroom of the vehicle is reduced. Further, a lubrication system for the differential is complicated.

Since the control device connected to the central differential is complicated in construction, it is very difficult to mount the control device on the central differential.

When a drum of the fluid operated clutch is rotated, pressure of oil in the drum is exerted on a piston mounted in the drum by centrifugal force, so that the control operation for the torque is deteriorated.

SUMMARY OF THE INVENTION

An object of the present invention is to provide a system for controlling a central differential for a four-wheel drive motor vehicle having a simple construction to provide a compact system with light weight.

Another object of the invention is to provide a control system which prevents pressure of oil caused by centrifugal force from exerting on a piston of a fluid operated clutch, thereby ensuring a desired clutch torque.

According to the present invention, there is provided a system for controlling a central differential having first and second output members for distributing power of an engine through a transmission to front and rear wheels respectively, and having a third output member for controlling distribution of the power, the system comprising restricting means having first friction engagement means operatively connected to the second and third output members for restricting differential operation of the central differential and for controlling distribution of the power to the front and rear wheels, transmitting means having second friction engagement means operatively connected to the second output member and either of the front and rear wheels, the restricting means being disposed at the innermost position adjacent an extension of an axis of the central differential, the transmitting means being disposed around the restricting means, and braking means disposed around the transmitting means for the first output member of the central differential.

The central differential comprises a planetary gear device including a first sun gear operatively connected to an output shaft of the transmission, a carrier operatively connected to the third output member, first and second planetary pinions integral with each other and rotatably supported on the carrier, and a second sun gear connected to the second output member. The first planetary pinion engages with the first sun gear, the second planetary pinion engages with the second sun gear, the carrier is operatively connected to the first output member connected to either of the front and rear wheels, the second output member is operatively connected to the other wheels, and the first and second friction means are fluid operated clutches respectively.

The other objects and features of the present invention will become understood from the following description with reference to the accompanying drawings.

DETAILED DESCRIPTION OF THE PREFERRED EMBODIMENTS

Figure 1:
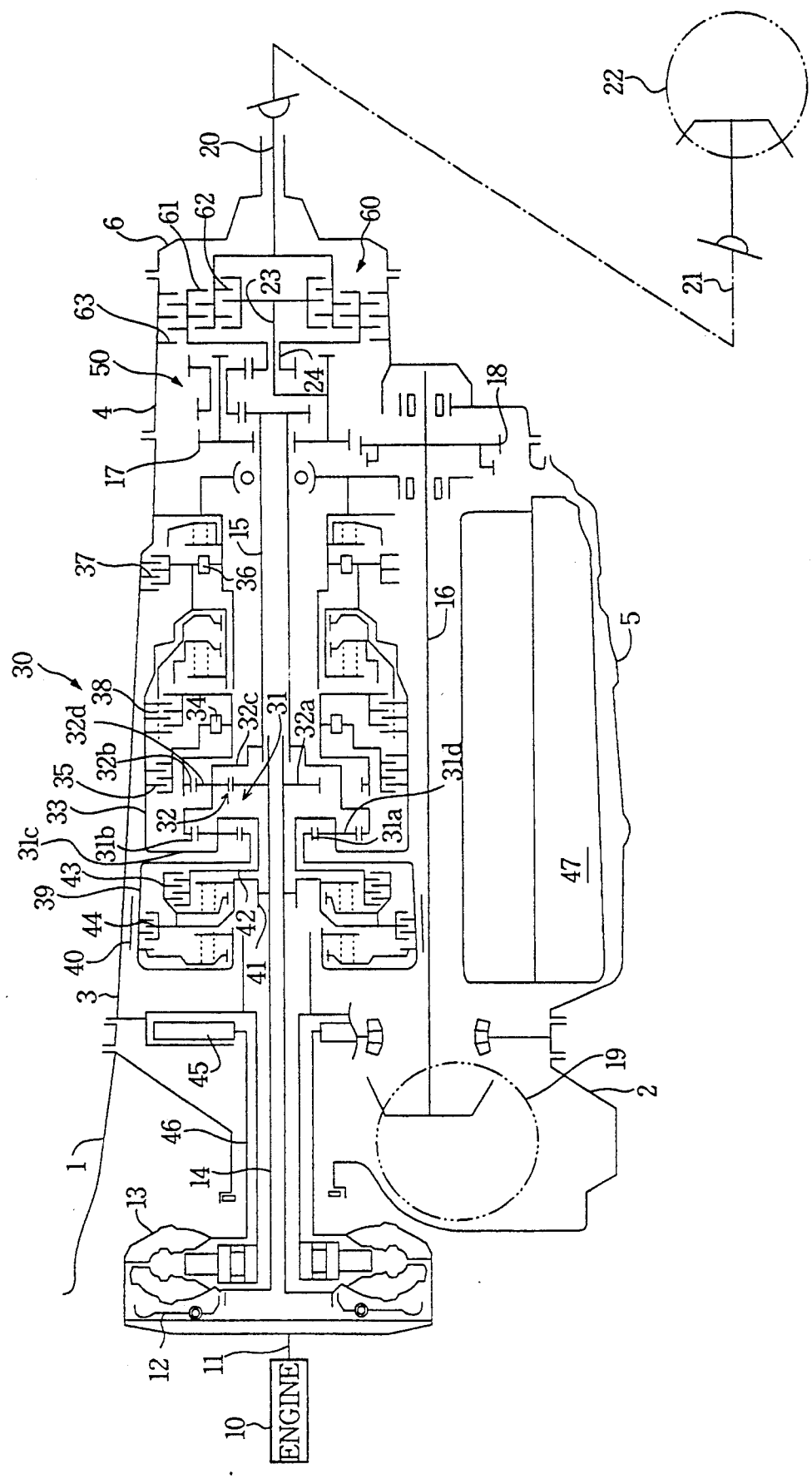
FIG. 1 shows a schematic diagram of a power transmission system for a four-wheel drive motor vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to a rear of the differential box 2. An oil pan 5 is attached to an underside of the transmission case 3. A crankshaft 11 of the engine 10 is operatively connected with the torque converter 13. An input shaft 14 extends from a turbine of the torque converter 13 to the automatic transmission 30. Output of the automatic transmission 30 is transmitted to an output shaft 15 which is aligned with the input shaft 14 for rearwardly transmitting the torque. The output shaft 15 is connected to a front drive shaft 16 which is parallelly disposed under the automatic transmission 30 through a pair of reduction gears 17 and 18 of a central differential 50 housed in a transfer case 4. A central differential control device 60 housed in an extension case 6 is disposed behind the central differential 50. The front drive shaft 16 is connected to front wheels through the front differential 19. The output shaft 15 is operatively connected to a rear drive shaft 20 provided in the extension case 6 through the central differential 50 and the control device 60. The rear drive shaft 20 is connected to rear wheels through a propeller shaft 21 and a rear differential 22.

The automatic transmission 30 comprises two sets of single planetary gears having a front planetary gear 31 and a rear planetary gear 32 for providing four forward speeds and one reverse speed. The front planetary gear 31 comprises a sun gear 31a, a pair of planetary pinions 31d, a ring gear 31b, and a carrier 31c. The rear planetary gear 32 comprises a sun gear 32a, a pair of planetary pinions 32d, a ring gear 32b, and a carrier 32c. The input shaft 14 is engaged with the rear sun gear 32a, and the front ring gear 31b and the rear carrier 32c are connected to the output shaft 15.

Between a connecting element 33 formed integral with the front carrier 31c and the rear ring gear 32b, a first one-way clutch 34 and a forward clutch 35 are disposed in series. A second one-way clutch 36 and a low and reverse brake 37 are disposed between the connecting element 33 and the transmission case 3 in parallel. An overrunning clutch 38 is disposed between the connecting element 33 and the ring gear 32b. A brake band 40 is provided on a connecting element 39 integral with the sun gear 31a. A high clutch 43 is mounted between a connecting element 41 integral with the input shaft 14 and a connecting element 42 integral with the carrier 31c. A reverse clutch 44 is provided between the connecting elements 39 and 41.

An oil pump 45 is provided on a front end of the transmission case 3. A pump drive shaft 46 is connected to an impeller 13a of the torque converter 13 and is operatively connected with a rotor of the oil pump 45.

In the oil pan 5, a control valve body 47 is provided for hydraulically actuating respective clutches and the brakes of the transmission 30.

Figure 2:
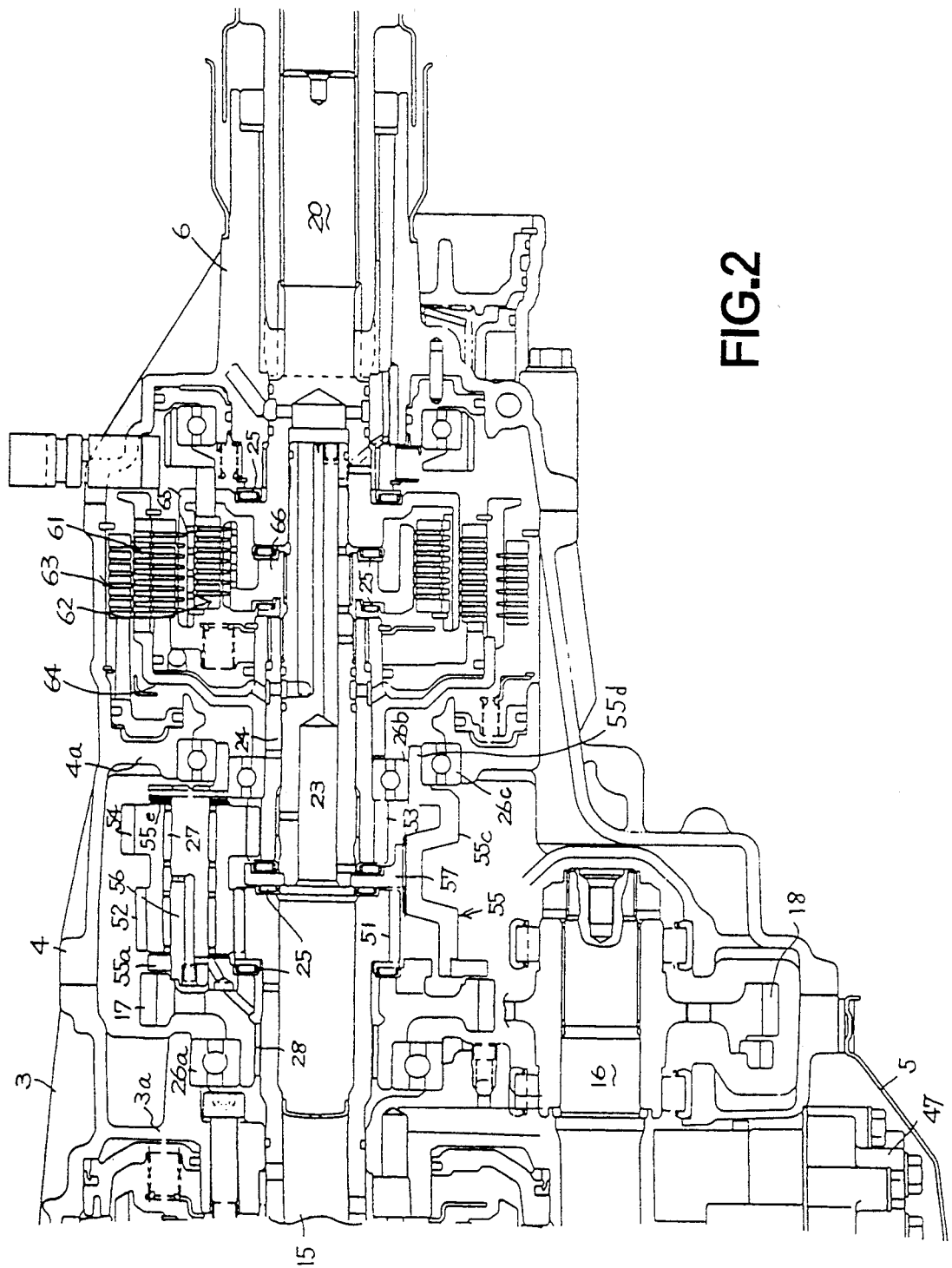
FIG. 2 shows an enlarged sectional view of a central differential and a central differential control device of the system.

Referring to FIG. 2 showing the central differential 50 and the control device 60. A first intermediate shaft 23 is axially disposed with the output shaft 15. A rear portion of the intermediate shaft 23 is rotatably mounted in the rear drive shaft 20. A second intermediate shaft 24 is rotatably mounted on the first intermediate shaft 23. The reduction gear 17 is rotatably mounted on the output shaft 15 through a bearing 28 and a thrust bearing 25. The reduction gear 17 and the output shaft 15 are mounted on an inside wall 3a of the transmission case 3 through a ball bearing 26a. The central differential 50 is disposed between the output shaft 15, reduction gear 17, and intermediate shafts 23 and 24.

The central differential 50 as a complex planetary gear device comprises a first sun gear 51 formed on the output shaft 15, a first planetary pinion 52 meshed with the first sun gear 51, a second sun gear 53 formed on the second intermediate shaft 24, a second planetary pinion 54 meshed with the second sun gear 53, and a carrier 55.

Figure 3:
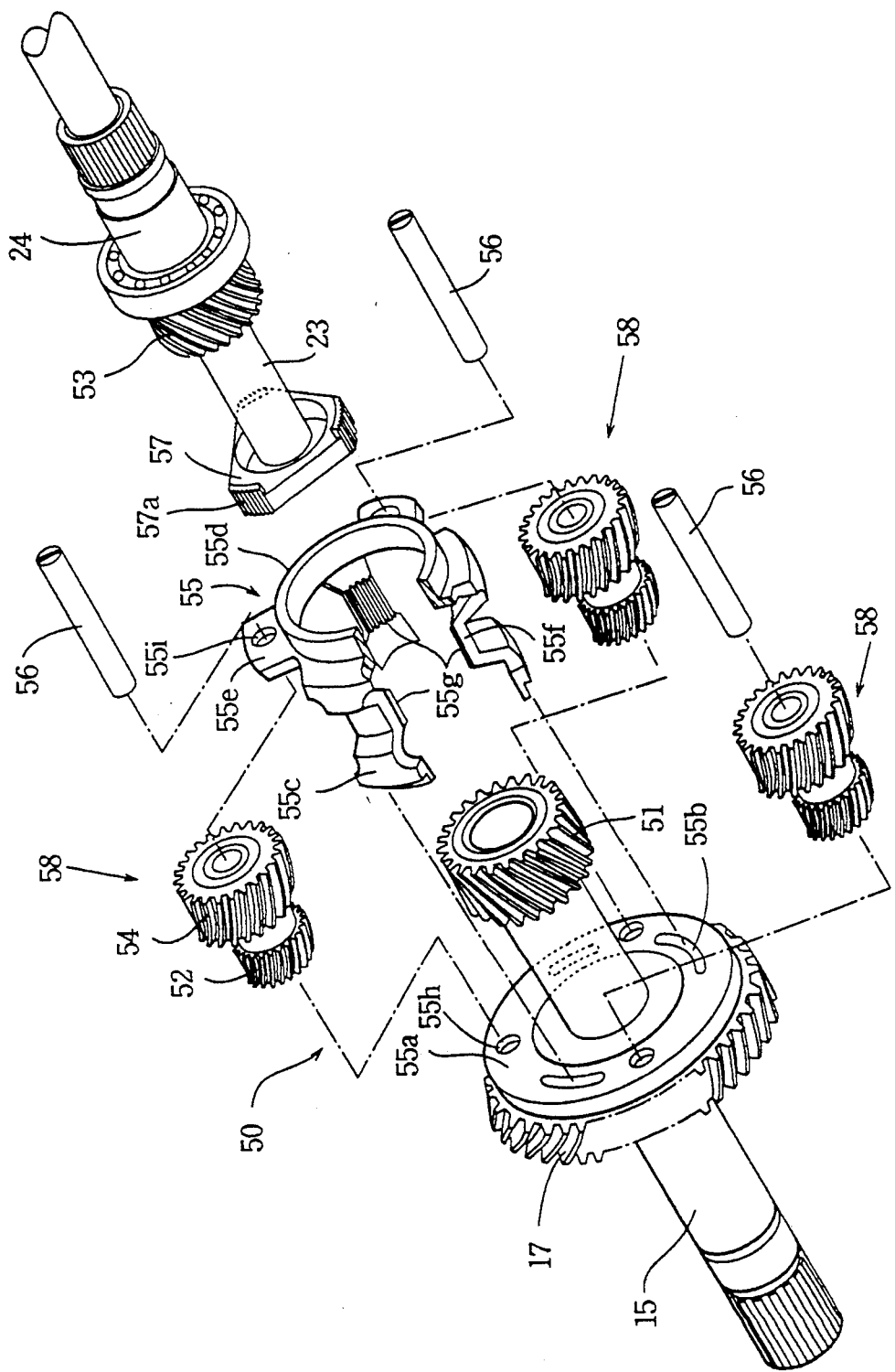
FIG. 3 is an exploded perspective view showing the central differential.

Describing the central differential 50 more in detail with reference to FIG. 3, the carrier 55 comprises a flange 55a secured to the reduction gear 17, three arms 55c engaged with slits 55b formed on the flange 55a, and a boss 55d integral with the arms 55c. Three lugs 55e having holes 55i are formed on the circumference of the boss 55d between the arms 55c. Each arms 55c has a U-shaped step portion 55f formed in a central portion thereof. Three step portions 55f are adapted to define a circle the diameter of which is slightly smaller than that of the boss 55d. The first intermediate shaft 23 has a connecting member 57 disposed between the second sun gear 53 formed on the shaft 24 and the first sun gear 51 formed on the input shaft 15. The connecting member 57 has a triangle shape and splines 57a formed on each corner thereof. The connecting member 57 is mounted in the arms 55c of the carrier 55 through the boss 55d and splined to the splines 55g of the step portion 55f with the splines 57a. The first and second planetary pinions 52 and 54 are integral with one another to form a pinion member 58. The pinion member 58 is rotatably mounted on a shaft 56 through needle bearings 27. The shaft 56 is inserted in to a hole 55h of the flange 55a and the hole 55i of the boss 55d between the arms 55c. The boss 55e formed at the rear end of the carrier is rotatably mounted on the second intermediate shaft 24 through a ball bearing 26b and rotatably supported in the transfer case 4 through a ball bearing 26c.

Thus, the output torque from the output shaft 15 is transmitted to the carrier 55 and the second sun gear 53 through the first sun gear 51 and the pinions 52, 54 at predetermined respective torque split ratios. The difference between rotating speeds of the carrier 55 and the second sun gear 53 is absorbed by the rotation of the first and second planetary pinions 52 and 54.

Figure 4:
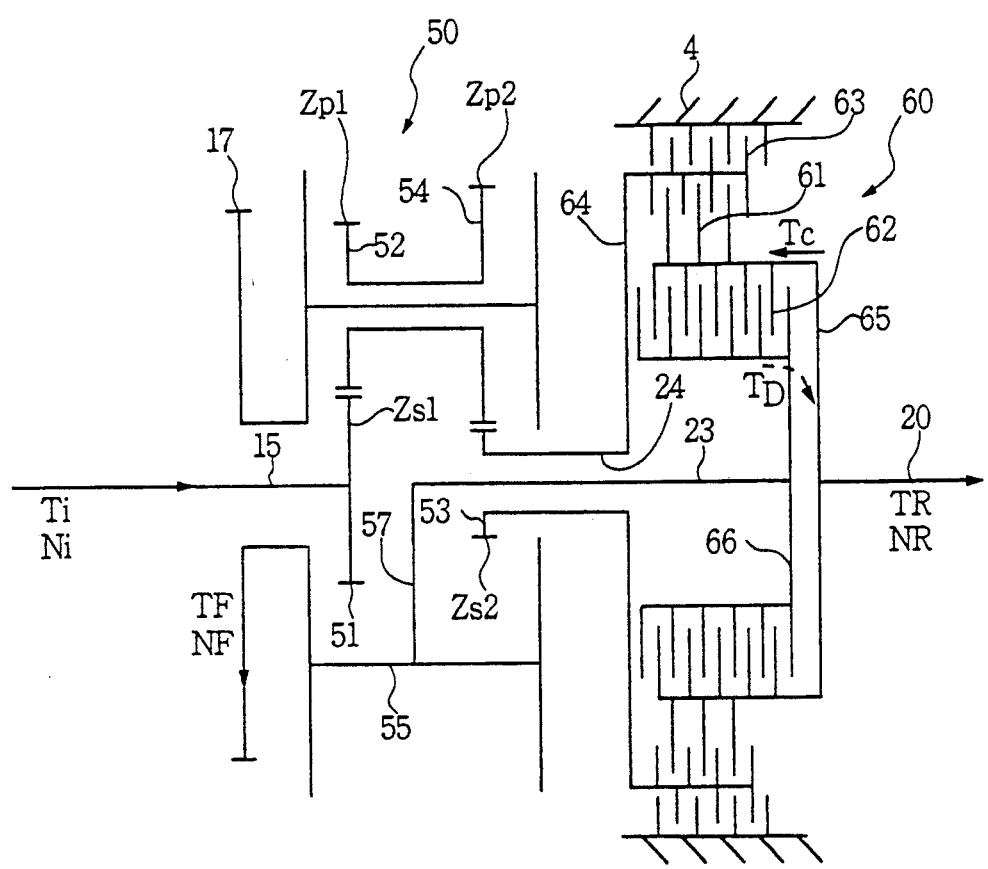
FIG. 4 is a schematic view showing the central differential and the control device.

The operation of the central differential 50 for distributing the torque to front wheels and rear wheels will be described hereinafter with reference to FIG. 4.

Input torque Ti of the first sun gear 51 and the relationship between the sun gears 51,53 and pinions 52,54 are expressed as follows, respectively.

$$T_i = T_F + T_R \quad (1)$$

$$rs_1 + rp_1 = rs_2 + rp_2 \quad (2)$$

where $T_F$ is the front torque transmitted from the carrier 55 to the front drive shaft 16, $T_R$ is the rear torque transmitted from the second sun gear 53 to the rear drive shaft 20, $rs_1$ is the radius of the pitch circle of the first sun gear 51, $rp_1$ and $rp_2$ are radii of pitch circles of first and second pinions 52 and 54, respectively, and $rs_2$ is the radius of the pitch circle of the second sun gear 53.

A tangential load P on the engaging point of the first sun gear 51 and the first pinion 52 is equal to the sum of a tangential load $P_1$ on the carrier 55 and a tangential load $P_2$ on the engaging point of the second sun gear 53 and the second pinion 54. That is, $$P = T_i / rs_1$$

$$P_1 = T_F / (rs_1 = rp_1)$$

$$P_2 = T_R/rs_2$$

$$Ti/rs_1 = \{T_F/(rs_1 + rp_1)\} + T_R/rs_2 \quad (3)$$

Substituting equations (1) and (2) for the equation (3), $$T_F = (1 - rp_1 \cdot rs_2/rs_1 \cdot rp_2) \times Ti$$

$$T_R = (rp_1 \cdot rs_2/rs_1 \cdot rp_2) \times Ti$$

Consequently, it will be seen that the standard torque distribution for the front torque $T_F$ and the rear torque $T_R$ can be set to various values by changing the radii of the pitch circles of the sun gears 51 and 53 and the pinions 52 and 54.

Here, radii $rs_1$, $rp_1$, $rp_2$ and $rs_2$ of the first sun gear 51, the first and second pinions 52, 54 and the second sun gear 53 can be replaced with the respective numbers of the teeth $Zs_1$, $Zp_1$, $Zp_2$, and $Zs_2$. If $Zp_1 = Zp_2 = 21$, $Zs_1 = 33$, and $Zs_2 = 21$, the torque distribution ratio of the front wheels and the rear wheels is $$T_F : T_R 36.4 : 63.6$$

A large torque can be distributed to the rear wheels.

Figure 5:
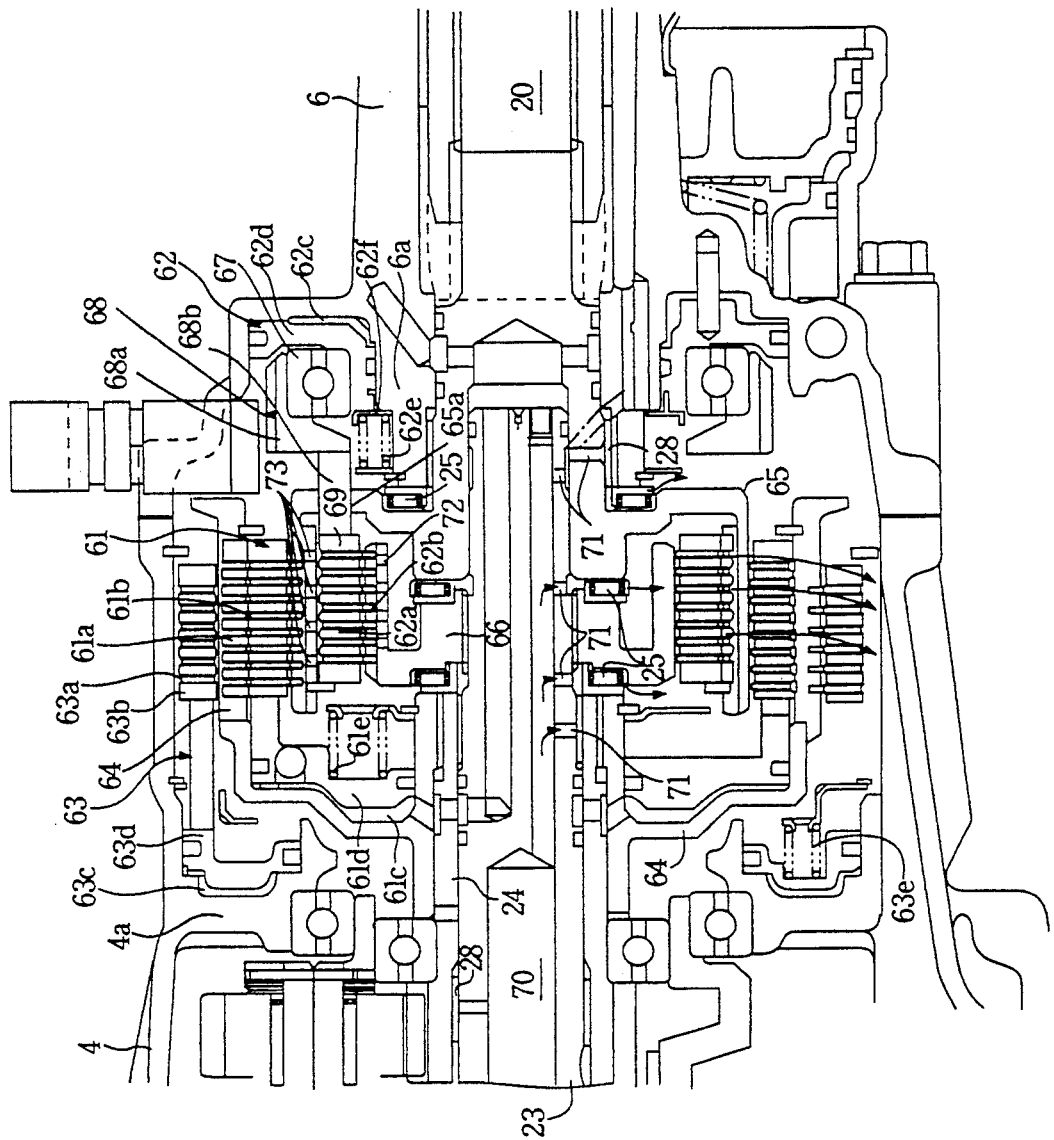
FIG. 5 shows an enlarged sectional control device.

Referring to FIG. 5, the control device 60 in the extension case 6 comprises first and second fluid operated multiple-disk friction clutches 62 and 61 for changing the standard torque split ratios to the front and the rear wheels, and a 5th speed brake 63 as a brake for arresting the operation of the central differential 50. The clutches 62 and 61, and the brake 63 are coaxially triplicated on the first intermediate shaft 23 in the radial direction thereof. The first clutch 62 is provided between the first intermediate shaft 23 and the rear drive shaft 20, and comprises a drive drum 66 splined on the first intermediate shaft 23 and a driven drum 65 formed on a front end of the rear drive shaft 20. A plurality of drive disks 62b are splined on the drive drum 66. A plurality of driven disks 62a are splined on an inner periphery of the driven drum 65 and disposed alternately with the disks 62b. A ring piston 62d is slidably mounted on a boss 6a of the extension case 6 formed at the inner portion thereof, and the inner wall of the extension case. An oil chamber 62c is defined between the piston 62d and the extension case 6 so as to prevent the centrifugal oil force from generating. A return spring 62e provided in a spring holder 62f is mounted on the boss 6a to be abutted on the piston 62d.

On the piston 62d, a pressure member 68 is mounted through a ball bearing 67 for absorbing the difference of rotating speeds between those of the piston and disks.

Figure 6:
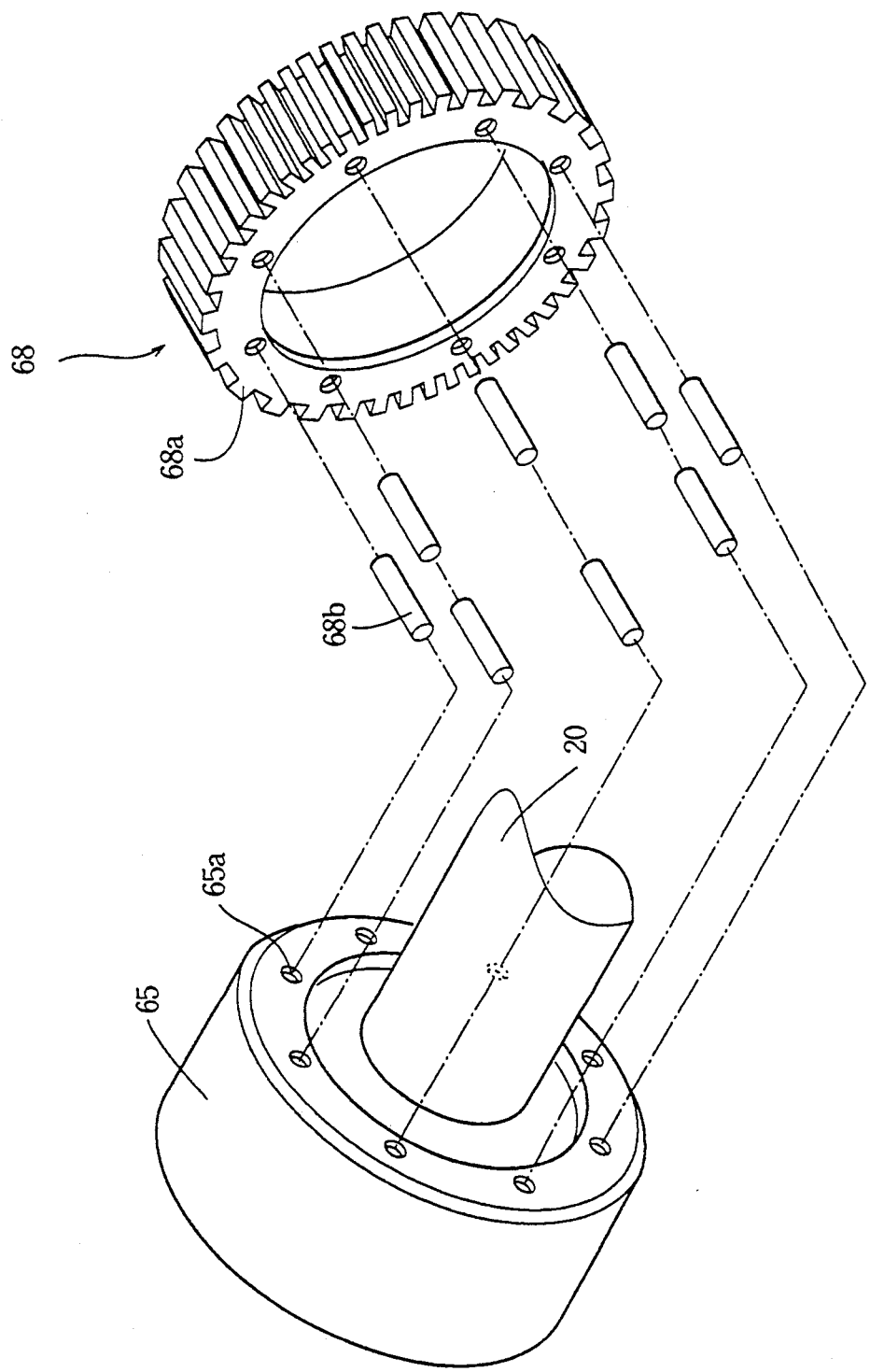
FIG. 6 is an exploded perspective view showing a part of the control device.

Referring to FIG. 6, the pressure member 68 comprises a ring gear 68a engaged with the ball bearing 67 (FIG. 5) and a plurality of rods 68b secured to a side thereof to be projected therefrom. The driven drum 65 has a plurality of holes 65a formed on an annular flange thereof corresponding to the rods 68b. The rods 68b are slidably inserted into holes 65a and engaged with a retainer 69 for the disks.

When the oil is supplied to the chamber 62c, the piston 62d is pushed by the pressure of the oil. The pressure member 68 is moved toward the driven drum 65 to push the rods 68b in the drum 65 so that the rods 68 are abutted on the retainer 69. Thus, the disks 62a and 62b are engaged with the adjacent disks to engage the clutch 62 for producing a clutch torque. Since the first intermediate shaft 23 is connected to the carrier 55 through the connecting member 57, the carrier 55 is connected to the first clutch 62 through the intermediate shaft 23.

In the clutch 62, since the piston 62d is indirectly engaged with the disks on the drum 65, the diameter of the piston is determined irrespective of the diameter of the disk and the drum. Therefore, even if the clutch 62 is provided in the innermost portion of the control device 60, the diameter of the piston can be increased for increasing the clutch torque.

The second clutch 61 is provided between the second intermediate shaft 24 and the rear drive shaft 20 and comprises a drive drum 64 splined on the second intermediated shaft 24 and the driven drum 65. A plurality of drive disks 61a are splined on an inner periphery of the drive drum 64. A plurality of driven disks 61b are splined on the driven drum 65 and disposed alternately with the disks 61a. A ring piston 61d is slidably mounted on the inner wall of the drive drum 64. The piston 61d engages with the end disk 61a. An oil chamber 61c is defined between the piston 61d and the drive drum 64. A return spring 61e is provided between the piston 61d and the drive drum 64.

When the oil is supplied to the oil chamber 61c, the disks 61a and 61b of the clutch 61 are engaged so that the second intermediate shaft 24 is connected to the rear drive shaft 20 through the clutch 61.

The 5th speed brake 63 is provided on the second intermediate shaft 24. A plurality of disks 63a are splined on the drive drum 64. A plurality of disks 63b are splined on the inner periphery of the transfer case 4. A piston 63d is slidably mounted on a boss 4a of the transfer case 4. An oil chamber 63c is formed between the piston 63d and the transfer case 4. A return spring 63e is provided between the piston 63d and the transfer case 4.

When oil is supplied to the chamber 63c, the piston 63d is pushed by the oil pressure. The piston 63rd presses the disks 63b and 63a to effect the brake 63.

The shafts and drums are supported with each other through bearing 28 and thrust bearings 25.

The clutches 61 and 62 and the brake 63 are hydraulically controlled by the operation of the system in the control valve body 47.

The operation of the automatic transmission 30 for providing the four forward speeds and one reverse speed will be described hereinafter.

In a first speed of a drive, a "2" or a "3" range, the forward clutch 35 is engaged. When the vehicle is accelerated, the ring gear 32b is fixed together with the connecting element 33 by engagement of the one-way clutches 34 and 36. Thus, the output of the input shaft 14 is transmitted to the output shaft 15 through the sun gear 32a and the carrier 32c. When the vehicle is coasting, the one-way clutches 34 and 36 become free. Accordingly, regardless of the engagement of the overrunning clutch 38, the rotation of output shaft 14 is not transmitted to the engine, so that the engine braking does not effect.

In the 1st speed of "1" range, the low and the reverse brake 37 and the overrunning clutch 38 are engaged, so that the ring gear 32b is always locked to effect the engine brake.

In a 2nd speed of the drive, the "2" or the "3" range, the forward clutch 35 and the brake band 40 are engaged to lock the sun gear 31a. The rotation of carrier 31c is transferred to the ring gear 32b through the connecting element 33, the forward clutch 35, and the one-way clutch 34, for increasing in speed. When the vehicle is decelerated, the overrunning clutch 38 is engaged to hold the engagement of the connecting element 33 with the ring gear 32b. Thus, the rotation of the output shaft 15 is transmitted to the engine to effect the engine brake.

In a 3rd speed of the drive or the "3" range, the forward clutch 35 and the high clutch 43 are engaged, so that the input shaft 14 is coupled with the ring gear 32b by the high clutch 43 through the connecting elements 41, 42, the carrier 31c, the connecting element 33, the forward clutch 35, and the one-way clutch 34. Accordingly, the rear planetary gear 32 is integrated as one unit to directly connect the input shaft 14 with the output shaft 15. At deceleration, the overrunning clutch 38 is engaged for restricting the one-way clutch 34, thereby effecting the engine brake.

In a drive range 4th speed, in addition to the drive or the "3" range of the 3rd speed, the brake band 40 clamps the sun gear 31a. The ring gear 31b is rotated at higher speed and the rotation is transferred to the output shaft 15. In this range, since the rotation is transmitted without the one-way clutches 34, 36, the engine brake is always effected.

In a reverse range (R), the reverse clutch 44 is engaged. The input shaft 14 drives the sun gear 31a. The carrier 31c is fixed together with the connecting element 33 by the engagement of the low and reverse brake 37. The ring gear 31b in the front planetary gear 31 rotates in the reverse direction to drive the output shaft 15 at a large gear ratio, for providing the reverse speed.

During the aforementioned operations, the brake 63 for the fifth speed is released. The clutch 61 is engaged to provide the four-wheel drive system. The clutch 62 is engaged to produce a clutch torque for restricting the differential operation corresponding to the slipping of the front wheels and rear wheels.

In the fifth speed of the drive range, the brake 63 is engaged to lock the second intermediated shaft 24 and the second sun gear 53, thereby preventing the differential operation of the central differential 50. The carrier 55 serves as a speed-up gear for increasing the speed of the first sun gear 51. In this state, if the gear ratio obtained by the central differential 50 is insufficient, the transmission 30 is shifted to the second speed.

If a gear ratio of the second speed is $i_2$ and a gear ratio obtained by the central differential 50 is ip, a gear ratio of the fifth speed $i_5$ is represented as $$i_5 = i_2 \cdot ip$$

In accordance with the aforementioned conditions of gears and pinions of the central differential 50, the gear ratio ip is $ip=(33-21)/33=0.363$. If $i_2$ is 1.545, $i_5$ becomes 0.561. Thus, the gear ratio which is smaller than that of the fourth speed is obtained at a proper gear ratio interval. The hydraulic pressure of the clutch 62 is controlled corresponding to the driving conditions of the engine 10 and the conditions on the road surface for producing a necessary transmitting torque. Thus, the four-wheel drive system is established with a torque split control system.

The operations of clutches and brakes of the transmission 30 and the control device 60 in relation to the shift ranges are shown in the table 1.

TABLE 1

| RANGES | CLUTCHES, BRAKES | | | | | | | | | |
|---|---|---|---|---|---|---|---|---|---|---|
|  | 44 | 40·43 | 35 | 34 | 38 | 37 | 36 | 63 | 61 | 62 |
| D RANGE | | | | | | | | | | |
| 1ST SPEED |  |  | ○ | ○ |  |  | ○ |  | ○ | ● |
| 2ND SPEED |  | ○ | ○ | ○ |  |  |  |  | ○ | ● |
| 3RD SPEED |  | ○ | ○ | ○ |  |  |  |  | ○ | ● |
| 4TH SPEED |  | ○ ○ | ○ |  |  |  |  |  | ○ | ● |
| 5TH SPEED |  | ○ |  | ○ | ○ |  |  | ○ | ○ | ⊚ |
| REVERSE | ○ |  |  |  |  | ○ |  |  | ○ | ● |

In the table 1, marks ○ show engagements of clutches and brake, marks ● clutch torque produced in the clutch 62 for restricting the differential operation, and a mark ⊚ shows the transmitting torque for controlling the split of torque to front and rear wheels.

The table 2 shows gear ratios, examples of gear ratio distribution ratios in relation to the shift ranges.

TABLE 2

|  | GEAR RATIO | EXAMPLES | STANDARD TORQUE SPLIT RATIO TF/TR |
|---|---|---|---|
| 1ST SPEED | $i1 = 1 + (1/\alpha2)$ | 2.785 | 36.4/63.6 |
| 2ND SPEED | $i2 = (\alpha1 + \alpha2 + \alpha1 \cdot \alpha2)/(1 + \alpha1)\alpha2$ | 1.545 | " |
| 3RD SPEED | $i3 = (1 + \alpha2)/(1 + \alpha2)$ | 1.000 | " |
| 4TH SPEED | $i4 = 1/(1 + \alpha1)$ | 0.694 | " |
| 5TH SPEED | $i5 = i2 \cdot ip$ | 0.561 | POWER DISTRIBUTION BY CLUTCH |
| REVERSE | $iR = 1/\alpha1$ | 2.272 | 36.4/63.6 |

In the table 2, $\alpha_1$ is a gear ratio of the number of the teeth $Zfs_1$ of the sun gear 31a to the number of the teeth $ZR_1$ of the ring gear 31b in the front planetary gear 31 obtained by $\alpha_1 = Zfs_1/ZR_1$, and $\alpha_2$ is a gear ratio of the number of the teeth $Zrs_2$ of the sun gear 32a to the number of the teeth $ZR_2$ of the ring gear 32b in the rear planetary gear 32 obtained by $\alpha_2 = Zrs_2/ZR_2$.

If rotating speeds of the ring gear 31b, the sun gear 31a and the carrier 31c of the front planetary gear 31 are $NR_1$, $Ns_1$, $Nc_1$, respectively, the relationship between the rotating speeds of each element for the front planetary gear 31 is represented by an equation as follows.

$$NR_1 + \alpha_1 \cdot Ns_1 = (1+\alpha_1) \cdot Nc_1$$

where $\alpha_1 = Zfs_1/ZR_1$. If rotating speed of the ring gear 32b, the sun gear 32a and the carrier 32c of the rear planetary gear 32 are $NR_2$, $Ns_2$, and $Nc_2$, respectively, the relationship between the rotating speeds of each element of the rear planetary gear 32 is represented by an equation as follows.

$$NR_2 + \alpha_2 \cdot Ns_2 = (1+\alpha_2) \cdot Nc_2$$

where $\alpha_2 = Zrs_2/ZR_2$.

Describing a lubricating system for the control device 60, an oil passage 70 is formed in the first intermediate shaft 23. The oil ports 71 are communicated with the passage 70 for lubricating the bearings and the thrust bearings 25 on the drums 64, 65 and 66. A plurality of oil ports 72, 73 and 74 are provided in the drive drum 66, driven drum 65 and drive drum 64, for lubricating respective drive disks and driven disks.

Describing the operation of the system, the power of the engine 10 is transmitted through the torque converter 13 and the input shaft 14 to the transmission 30. Accordingly, the front and rear planetary gears 31 and 32 are operated and clutches 44, 43, 35, 38, 36, 34 and brakes 40, 37 are selectively actuated, so that the four forward speeds and one reverse speed are provided as described hereinbefore. The output of the transmission 30 is transmitted to the first sun gear 51 of the central differential 50.

In order to stably drive the vehicle on roads in general, the second clutch 61 is engaged, thereby connecting the second sun gear 53 of the central differential 50 with the rear drive shaft 20 through the second intermediate shaft 24 and the clutch 61. Thus, the first mode, wherein the torque is distributed in accordance with the first standard torque split ratio is selected. Namely, the standard torque split ratio is determined $T_F:T_R=36.4:63.6$, dependent on the number of the teeth of the first and second sun gear 51, 53 and the pinions 52, 54. Thus, 36.4% of the output torque of the transmission 30 is transmitted to the front wheels through the carrier 55, the reduction gears 17, 18, the first drive shaft 16 and the front differential 19. Meanwhile, 63.6% of the torque is transmitted to the rear wheels through the second sun gear 53, second intermediate shaft 24, second clutch 61, the rear drive shaft 20, the propeller shaft 21 and the rear differential 22. Thus, the four-wheel driving is established. The vehicle is in an oversteering condition so that good cornering maneuverability, driveability and steerability are obtained.

When the vehicle makes a turn, the rotating difference in speeds of the front and rear wheels is sufficiently absorbed by the first and second pinions 52, 54 of the central differential 50, thereby preventing the tight corner braking and ensuring good operability.

If the vehicle is driven on a slippery road, the rear wheels slip first because the large amount of the torque is distributed to the rear wheels. Thus, the first clutch 62 is engaged at the clutch pressure. Consequently, the clutch torque Tc is produced in the clutch 62. The clutch 62 is provided in parallel with the carrier 55 and the second sun gear 53 of the central differential 50. Accordingly, the clutch torque Tc corresponding to the slip ratio is transmitted from the second sun gear 53 to the carrier 55 through the clutch 62, the intermediate shaft 23 and the connecting member 57 to increase the torque for the front wheels. To the contrary, the torque to the rear wheels is reduced to eliminate slipping, thereby improving driveability to ensure good operability and safe driving.

When the differential operation restricting torque Tc becomes maximum, the carrier 55 is directly engaged with the second sun gear 53 to lock the central differential 50. Thus, the four-wheel driving is established in accordance with the torque split corresponding to the axle loads of the front and rear wheels. Thus, the torque split is continuously controlled in accordance with the slip condition for preventing the four wheels from slipping.

If the engine speed is further increased at the fourth speed gear, the transmission is shifted to the second speed and the brake 63 is engaged so that the second sun gear 53 of the central differential 50 is locked to increase the rotating speed of the carrier 55 for providing the fifth speed. Consequently, the second speed of the transmission is largely increased in accordance with the central differential 50. The power is transmitted to the front wheels through the carrier 55. Thus, the vehicle can be driven at a high speed of overdrive having a smaller gear ratio than the gear ratio of the fourth speed.

On the other hand, the transmitting torque TD in the clutch 62 is variably controlled corresponding to the driving conditions and the slipping of the front wheels. The torque is transmitted to the rear wheels through the carrier 55, the first intermediate shaft 23 and the clutch 62. Thus, the four-wheel drive system is provided.

The vehicle is driven in an understeering condition, so that the stability of the vehicle at a high speed driving is improved. The torque is transmitted to the rear wheels corresponding to the transmitting torque TD. Therefore, the slipping of the wheels is prevented.

During four-wheel driving, the lubricating oil is fed to the ports 71 from the oil passage 70 for lubricating the thrust bearings 25, and further fed to drums 64, 65 and 66. The lubricating oil fed to the drum 64 is supplied to the oil chambers, ball bearing 67 and pressure member 68 of the clutches 61 and 62 through two passages. The lubricating oil fed to the drum 66 through one of the passages is supplied to the disks of the clutches 62 and 61, and the brake 63 in order through the ports 72, 73 and 74 by centrifugal force. The oil chamber of the brake 63 is supplied with oil through the transfer case 4.

Figure 7:
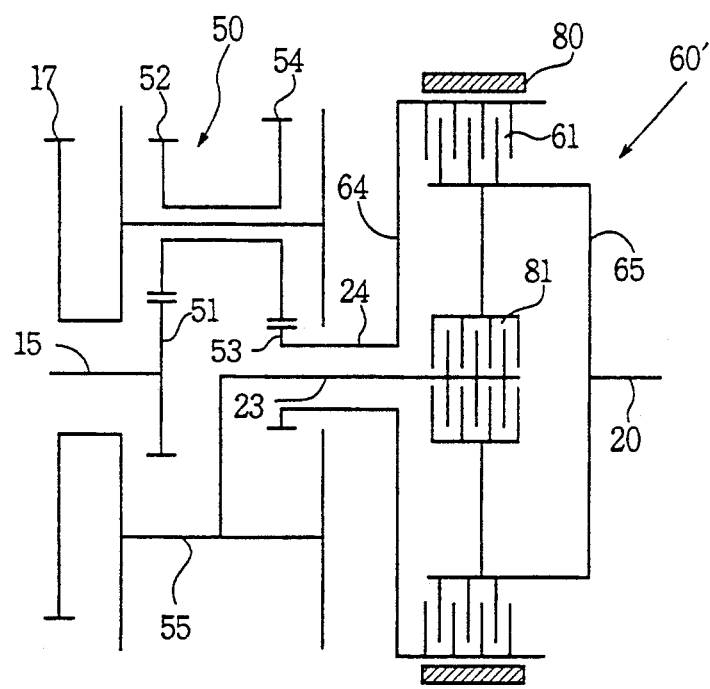
FIG. 7 is a schematic view showing a modification of the control device.

FIG. 7 shows a modification of the control device 60. In a device 60', a brake band 80 is attached to the drive drum 64 in place of the 5th speed brake 63. A viscous coupling 81 is provided between the first intermediate shaft 23 and the driven drum 65 for restricting the differential operation.

Figure 8:
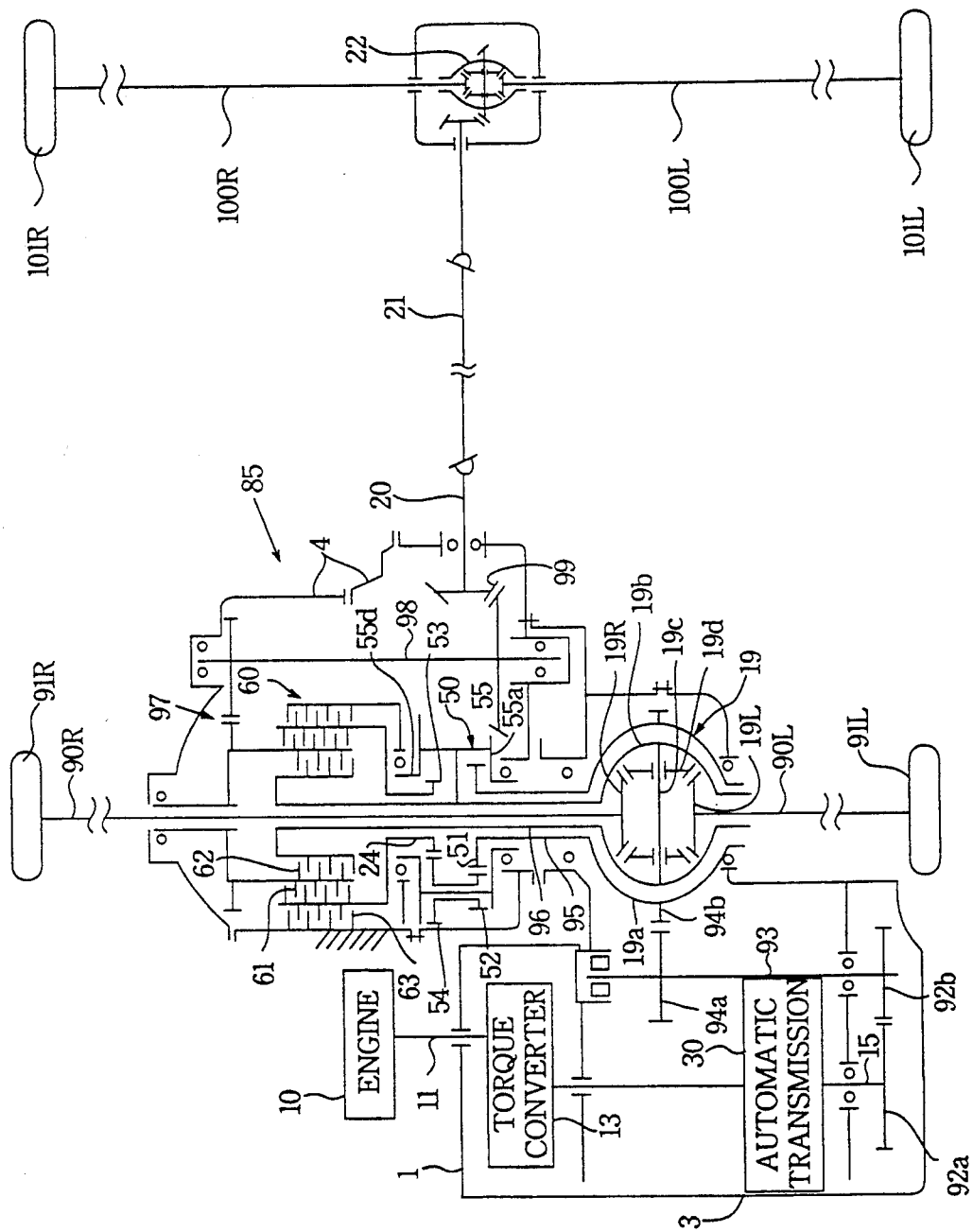
FIG. 8 shows a schematic diagram of the power transmission system of a second embodiment according to the present invention.

FIG. 8 shows a power transmission system of the second embodiment in which the engine 10 is laterally mounted on the motor vehicle at a front portion of the motor vehicle. The torque converter 13 connected to the engine 10 through the crankshaft 11 and the automatic transmission 30 are laterally mounted on the motor vehicle. The front axle differential 19 is housed in the transmission case 3, and a transfer device 85, the central differential 50 and the central differential control device 60 are housed in the transfer case 4. The output shaft 15 of the transmission 30 is connected to an intermediated shaft 93 which is parallel with the output shaft 15, through a pair of gears 92a and 92b.

A drive gear 94a fixedly mounted on the intermediated shaft 93 meshes with a final gear 94b which is fixed to opposed hub members 19a. The front axle differential 19 with a bevel gear has a differential case 19b connected to a first tubular output shaft 96 of the central differential 50. In the differential case 19b, there are provided a pinion shaft 19c secured to the differential case 19b, two differential pinions 19d rotatably mounted on the pinion shaft 19c and two bevel side gears 19L, 19R meshed with pinions 19d. The side gears 19L and 19R are connected to left and right front axles 90L and 90R so as to respectively transmit the output power of the transmission to the left and right front wheels 91L and 91R.

In the transfer case 4, the central differential 50 and the control device 60 are provided coaxially with the front differential 19 and the axle 90R, and the transfer device 85 is disposed behind the central differential 50.

The central differential 50 has a tubular input shaft 95 connected with the hub member 19a, and the multiple-disk friction clutch 62. The second intermediated shaft 24 is rotatably mounted on the first output shaft 96. The first output shaft 96 is rotatably mounted on the right front axle 90R. The central differential 50 comprises the first sun gear 51 integrally formed on the input shaft 95, the first planetary pinion 52 meshed with the first sun gear 51, the second sun gear 53 integrally formed on the second intermediate shaft 24, the second planetary pinion 54 meshed with the second sun gear 53, and the carrier 55. The flange 55a and the boss 55d are rotatably mounted on the input shaft 95 and the second intermediated shaft 24, respectively.

Thus, the output torque from the output shaft 15 of the transmission 30 is transmitted to the first sun gear 51 through the drive gear 94a, the final gear 94b, the hub member 19a and the input shaft 95 and further to the carrier 55 and the second sun gear 53 through the pinions 52, 54 at predetermined respective torque distribution ratios.

The construction and operation of the control device 60 are the same as the first embodiment.

A transfer drive gear 97a of the transfer device 85 is securely mounted on the clutch 61. The transfer drive gear 97a engages with a driven gear 97b securely mounted on a transfer shaft 98 of the transfer device 85 which is disposed behind the central differential 50. The transfer shaft 98 is connected to the rear drive shaft 20 perpendicular to the transfer shaft 98 through a pair of bevel gears 99a, 99b, thereby transmitting the power to rear axles 100L and 100R connected to the left and right rear wheels 101L and 101R by way of the rear drive shaft 20, the propeller shaft 21 and the rear differential 22.

Describing the operation of the system, the power of the engine 10 is transmitted through the torque converter 13 to the automatic transmission 30 at which the transmission ratio is controlled. The output of the transmission 30 is transmitted to the first sun gear 51 of the central differential 50 through the output shaft 15, the gears 92a, 92b, the intermediate shaft 93, the drive gear 94a, the final gear 94b, the hub members 19a and the input shaft 95. The torque of the carrier 55 is transmitted to the front wheels 91L, 91R through the first output shaft 96, the front differential 19 and the axles 90L and 90R. The torque is transmitted to the rear wheels 101L, 101R through the second sun gear 53, the second intermediate shaft 24, the clutch 62, the transfer drive and driven gears 97a and 97b, the transfer shaft 98, the bevel gears 99a and 99b, the rear drive shaft 20, the propeller shaft 21, the rear differential 22 and the rear axles 100L and 100R. Thus, a full-time four-wheel driving is established.

Accordingly, in the same manner as the first embodiment, the differential operation is restricted by the multiple-disk friction clutch 62 and the operational range of the transmission is shifted to the fifth speed by the engagement of the clutch 62 and the brake 63.

In accordance with the present invention, the central differential has a control device for providing multiple functions. The control device comprises first and second clutches and a brake which are coaxially triplicated at the rear of the central differential. Thus, the system is compact in size and simplified in the structure. Since the number of parts is reduced, the productivity of the system is improved.

The lubricating oil is fed from the inner portion to the outer portion of the control device by centrifugal force for preferably lubricating the respective parts. Thus, durability and reliability of the device are improved with a simple construction.

The oil chamber and the piston are provided in the clutch and the brake such that oil pressure exerted on the piston by the centrifugal force is cancelled. Thus, the controlling of the clutch pressure is ensured.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a central differential having an input member operatively connected to a transmission for receiving a power from the transmission a first output member operatively connected to a one side of front and rear wheels for transmitting power of an engine through the transmission to the one side of front and rear wheels, a second output member operatively connected to another side of the front and rear wheels for transmitting power to the another side of the front and rear wheels, and a third output member for controlling distribution of the power to the front and rear wheels, the improvement of the system which comprises:

first friction engagement means operatively connected to the second and third output members for restricting differential operation of the central differential and for controlling distribution of the power to the front and rear wheels;

second friction engagement means for connecting the second output member and the one side of the front and rear wheels operatively;

said first friction engagement means being disposed at the innermost position adjacent an extension of an axis of the central differential; and said second friction engagement means being disposed around said first friction engagement so as to effectively transmit and distribute power to each wheel in compact and simple structure.

2. The system according to claim 1, further comprising
braking means disposed around the transmitting means for braking rotation of the first output member of the central differential.

3. The system according to claim 2, wherein
the central differential comprises a planetary gear device including a first sun gear operatively connected to an output shaft of the transmission, a carrier operatively connected to the third output member, first and second planetary pinions integral with each other and rotatably supported on the carrier, and a second sun gear connected to the second output member, the first planetary pinion engages with the first sun gear, the second planetary pinion engages with the second sun gear, the carrier is operatively connected to the first output member connected to the one side of the front and rear wheels, the second output member is operatively connected to the another side of the front 2nd rear wheels, and the first and second friction means are fluid operated clutches respectively.

4. The system according to claim 3, wherein
each of the fluid operated clutches comprises a plurality of disks mounted on a drive drum and a driven drum, an oil chamber, a piston provided in the oil chamber for engage the disks with each other.

5. The system according to claim 4, wherein
the oil chamber is difined by a stationary member and the piston.

6. The system according to claim 4, wherein
the diameter of the piston is larger than that of the diameter of the outer side drum.

7. The system according to claim 4, further comprising a lubricating system which is provided for passing lubricating oil from the innermost restricting means to the outermost braking means.

8. The system according to claim 4, wherein
the third output member is disposed at the innermost position, the second output member is disposed around the third output member, the third output member has a connecting member which radially and outwardly extends at an inner end of the second output member and is operatively engaged with the carrier.

* * * * *